(12) United States Patent
Wasielewski (10) Patent No.: US 8,393,835 B2
(45) Date of Patent: Mar. 12, 2013

(54) DETACHABLE OPERATING HANDLE FOR A POWER TOOL

(75) Inventor: Kevin E. Wasielewski, Schaumburg, IL (US)

(73) Assignee: Robert Bosch GmbH, Stuttgart (DE)

( * ) Notice: Subject to any disclaimer, the term of this patent is extended or adjusted under 35 U.S.C. 154(b) by 939 days.

(21) Appl. No.: 12/485,173

(22) Filed: Jun. 16, 2009

(65) Prior Publication Data

US 2010/0316457 A1    Dec. 16, 2010

(51) Int. Cl.
*B27C 5/10* (2006.01)

(52) U.S. Cl. ................ 409/182; 144/136.95; 144/154.5; 200/43.17; 200/332.2; 173/170

(58) Field of Classification Search .................. 409/175, 409/181, 182; 144/136.95, 154.5; 200/330, 200/332.2, 293.1, 505, 43.11, 43.13, 43.16, 200/43.17, 43.18, 321; 173/170; 16/422, 16/426; 408/710
See application file for complete search history.

(56) References Cited

U.S. PATENT DOCUMENTS

| | | | | |
|---|---|---|---|---|
| 4,381,037 A | * | 4/1983 | Cuneo | 173/170 |
| 4,707,921 A | * | 11/1987 | Meyer et al. | 30/296.1 |
| 5,577,600 A | * | 11/1996 | Schoene et al. | 200/43.17 |
| 5,758,702 A | * | 6/1998 | Adams | 144/136.95 |
| 6,512,188 B2 | * | 1/2003 | Campbell et al. | 200/321 |
| 6,679,658 B2 | | 1/2004 | Landt | |
| 6,835,030 B2 | | 12/2004 | Pozgay et al. | |
| 6,861,598 B2 | * | 3/2005 | Bascom et al. | 200/43.17 |
| 7,131,180 B2 | | 11/2006 | Kopras et al. | |
| 7,131,898 B2 | | 11/2006 | Adkins et al. | |
| 7,261,166 B2 | | 8/2007 | Baber et al. | |

FOREIGN PATENT DOCUMENTS

EP          878273 A2 * 11/1998
WO    WO 2007088373 A1 *  8/2007

* cited by examiner

*Primary Examiner* — Daniel Howell
(74) *Attorney, Agent, or Firm* — Maginot, Moore & Beck (57) ABSTRACT

A detachable operating handle for an elongated handheld portable power tool with a nose portion having an output shaft and a slidable operating switch having an outer recess and being configured to slide between on and off positions, the handle comprising a housing configured to cooperatively mate with the power tool housing and be attached at least to the nose portion of the power tool, the housing having an elongated handle portion, a trigger located in the bottom of the handle portion positioned to be moved between depressed and rest positions by a user's finger while holding the handle portion, a linkage mechanism for interconnecting the trigger and the switch, and the linkage mechanism having a lockout mechanism for preventing the trigger from moving the switch when the lockout mechanism is in a locked position and permitting the trigger to move the switch when in a release position.

16 Claims, 8 Drawing Sheets

DETACHABLE OPERATING HANDLE FOR A POWER TOOL

BACKGROUND OF THE INVENTION

The present invention generally relates to portable handheld power tools.

Small handheld power tools that have a rotary output shaft are effective and convenient for using variously shaped cutting and other tools to cut or work with wood and other materials. Such tools are used by tradesman, hobbyists and others in a wide variety of applications and are well known, including those commercialized under the trade names ROTOZIP™ and DREMEL™. If such tools are used with a spiral bit, for example, they can cut materials much the same as is done with a conventional jigsaw, but depth control is difficult unless some type of accessory is provided for that purpose. Also, the convenient use and effective control of the tool can be increased for some cutting and other operations if an accessory handle is attached to the tool which allows for a different hand orientation compared to directly holding the power tool itself. While such accessories have been developed which provide a handle attachment for holding the tool, such known handles require independent operation of the on/off switch of the tool which can be inconvenient to manipulate during use.

SUMMARY OF THE INVENTION

Embodiments of the present invention are directed to a detachable operating handle for a power tool of the type that has an elongated housing with a nose portion having an output shaft defining a central longitudinal axis of the tool and a tool bit holding device for securing a tool bit, an operating switch having a switch cap located on the housing near the nose portion, with the switch cap having an outer recess and being configured to slide between on and off positions and be biased toward the off position, the handle comprising a housing configured to cooperatively mate with the power tool housing and be attached at least to the nose portion of the power tool, the housing having an elongated handle portion having a longitudinal axis that is generally perpendicular to the central longitudinal axis of the power tool when the handle is coupled to the power tool, a trigger member located in the bottom of the handle portion positioned to be moved between depressed and rest positions by a user's finger while holding the handle portion, a linkage mechanism for interconnecting the trigger member and the switch cap for moving the switch cap to its on position, and the linkage mechanism having a lockout mechanism for preventing the trigger member from moving the switch cap when the lockout mechanism is in a locked position and permitting the trigger member to move the switch cap when in a release position.

DETAILED DESCRIPTION

Embodiments of the present invention are directed to a detachable operating handle for use with a power tool of a type that has an elongated housing with a nose portion having an output shaft in a tool bit holding device for securing a tool bit such as a spiral cutting bit to operate in a manner similar to a jigsaw for cutting a work piece.

Figure 1:
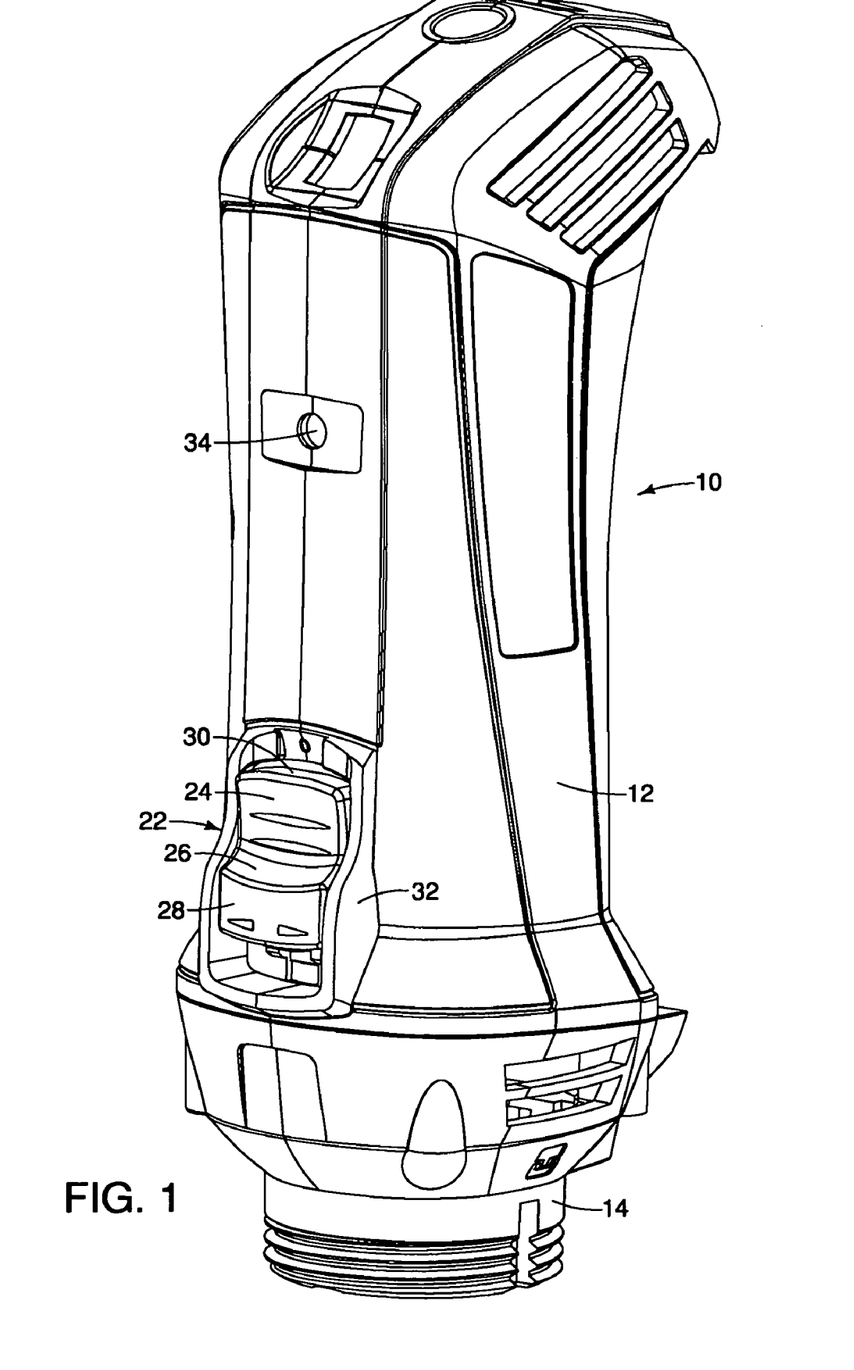
FIG. 1 is a front left perspective view of a power tool with portions removed, with the tool having a nose portion and an operating switch having a switch cap located near the nose portion.
Figure 2:
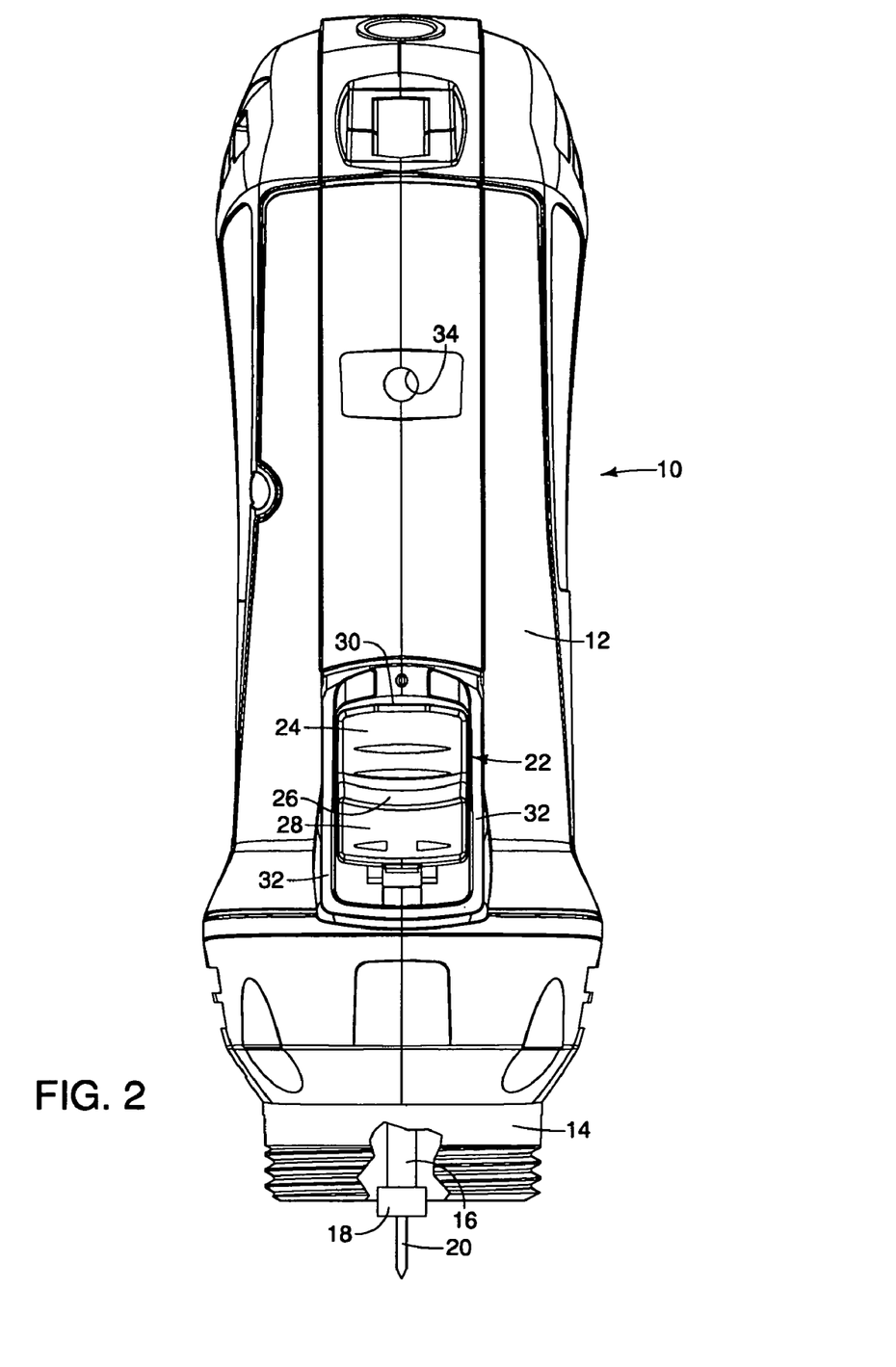
FIG. 2 is a front elevation of the tool shown in FIG. 1.

Turning now to the drawings, and particularly FIGS. 1 and 2, such a rotary tool is indicated generally at 10 and has an elongated housing 12 with a nose portion 14 and an output shaft 16, a tool bit holder such as a collet 18 or the like which is shown with a spiral side cutting bit 20 secured thereto in FIG. 2. The tool 10 has an ON/OFF switch with a switch cap, indicated generally at 22, and is shown in FIGS. 1 and 2 in an off position. The switch cap 22 has an upper cupped portion 24 shaped to be operated by a user's thumb or finger, which merges with a outwardly extending ramp portion 26 that in turn merges with a flat portion 28. The upper cupped portion 24 also has an end surface 30 that is generally perpendicular to the upper cupped portion 24. The switch cap 22 shown in FIGS. 1 and 2 is shown in its off position and is moved to an ON position by moving it downward as shown in FIGS. 1 and 2 to energize the motor of the tool to operate the same. While the switch may be designed and configured to stay in either its ON or OFF positions, it is preferred that it be biased toward its OFF position so that if the user does not continue to hold the switch in an ON position it will automatically be returned to its OFF position if the user releases pressure on the switch cap 22.

The housing 12 preferably has outwardly extending sidewalls 32 for retaining and protecting the switch cap 22 and the housing also has a female portion of a one quarter turn quick fastener 34 located above the switch cap 22 for receiving a male pin portion of the fastener that is provided in the detachable operating handle. Alternatively, a threaded aperture can be provided in the housing 12 for receiving a screw or the like for securing the detachable operating handle to the tool.

With regard to the operating handle, it is generally indicated at 40 and has a gripping handle portion 42 that merges with an upper body portion, indicated generally at 44, as well as with a lower body portion, indicated generally at 46. The handle portion 42 has a rear end portion 48 as well as a lower generally horizontal support portion 50 that is also interconnected with the lower body portion 46. The gripping handle portion 42, rear end portion 48 and lower support portion together define an opening, indicated generally at 52, which enables a user to hold onto the generally cylindrical gripping handle portion and have the fingers of the user's hand able to grip the handle portion 42 to guide and control the combination tool 10 and handle portion 40 during use. The forefinger of a user is then positioned to control a depressible trigger 54 that engages a linkage mechanism, indicated generally at 56 and best shown in FIGS. 5, 6, 8 and 9, for controlling the position of the switch cap 22 when the handle 40 is attached to the tool 10.

The lower body portion 46 includes a cylindrical mounting portion 58 having an inner diameter that is sized to receive the nose portion 14 of the tool 10 in fitting engagement, with the cylindrical mounting portion 58 having a split ring front configuration defined by two parallel ears 60 that are spaced from one another and have apertures 62 for receiving a thumb screw or the like which can be tightened to pull the split ring configuration toward one another to firmly grip the nose portion 14 of the tool 10.

It should be understood that while the mounting portion is shown to have a compression type of securing arrangement, other types of engagement may be employed, such as a bayonet type arrangement or a quarter turn accessory coupling arrangement such as is disclosed in U.S. Pat. No. 6,679,658 which is assigned to the same assignee as the present invention.

It is preferred that the mounting portion 58 be integrally formed with the lower body portion 46, but it should also be understood that other arrangements known to those of ordinary skill in the art can be used. The upper body portion 44 and lower body portion 46 have sidewalls 64 that form a channel, indicated generally at 66, which is sized and configured to receive the tool 10 in cooperative fitting relation so that when the nose portion 14 is placed in the mounting portion 58, the sidewalls 64 are preferably closely mated with the housing. The upper body portion 44 also has an aperture 68 configured to receive the male portion of the ¼ turn quick fastener 34 (not shown). Alternatively, the aperture 68 may be threaded to receive a screw, bolt or the like in the housing of the tool 10 to firmly attach the upper portion of the tool to the operating handle 40. The lower body portion 46 has a foot portion, indicated generally at 70, which includes a front slotted opening 72 that is configured to enable the tool bit 20 to extend below the bottom surface of the foot for cutting.

It should be understood that when the tool 10 is attached to the handle 40, the switch cap 22 is positioned inside of the channel 66 and is unaccessable for independent operation. It is highly desirable that the trigger 54 be the only means for turning the tool 10 on and off and the preferred embodiment of the present invention exhibits this desirable feature.

Figure 5:
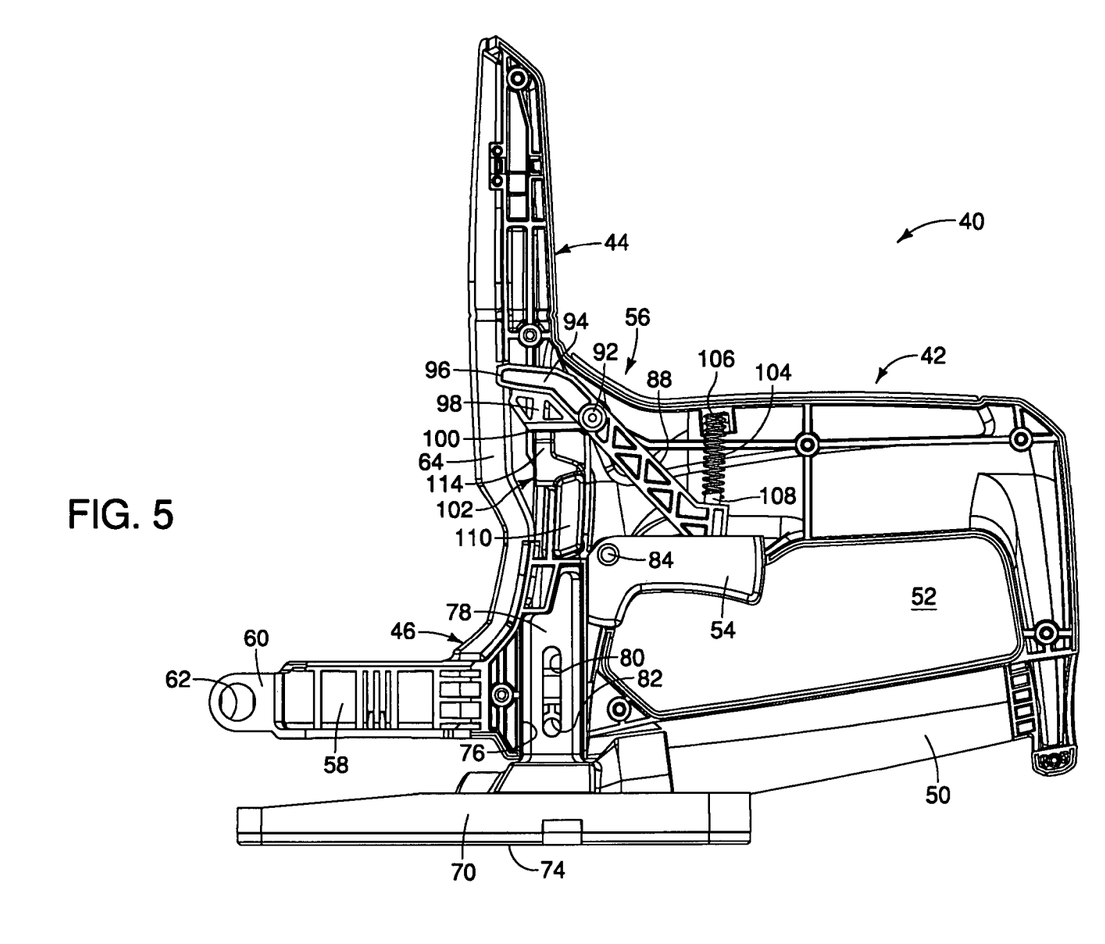
FIG. 5 is a left side elevation similar to FIG. 4, but with portions removed to show the internal construction of the operating handle, particularly illustrating the operating handle trigger in its rest position where the tool operating switch is in an OFF position.

As best shown in FIG. 5, the lower body portion 46 has an internal channel 76 configured to receive a stem portion 78 of the foot 70. The stem portion is generally perpendicular to the plane of the bottom surface 74 of the foot 70 and is vertically adjustable within the channel 76 to vary the depth of cut of a tool bit 20 that is mounted in the tool 10. This is accomplished by the stem portion 78 having an elongated slot 80 which is aligned with an aperture 82 in the far side of the lower body portion which is configured to retain a thumb screw or the like that can be loosened to adjust the vertical position of the shoe relative to the lower body portion 46 and be tightened to secure it in a desired position.

Figure 8:
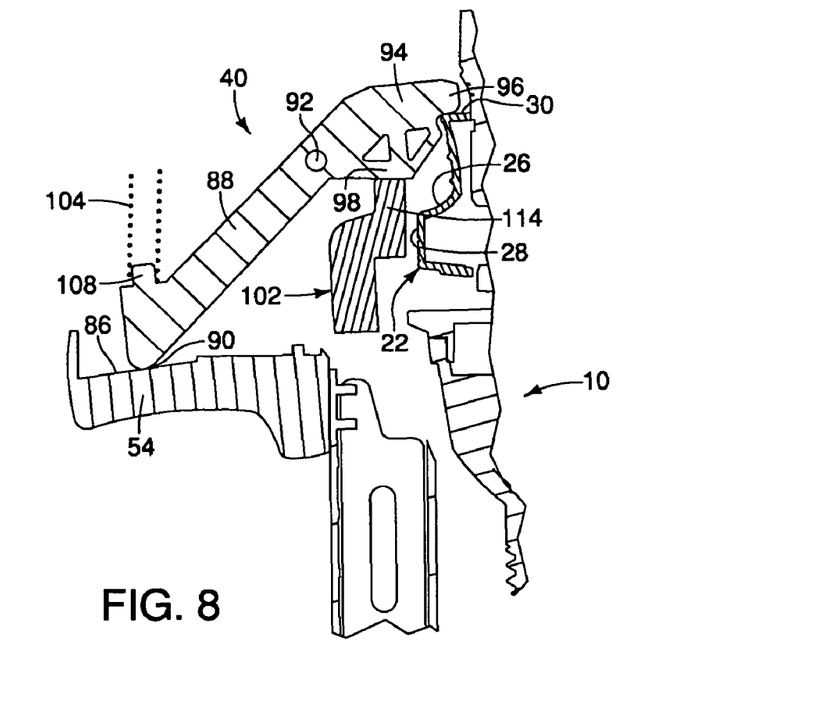
FIG. 8 is a cross-sectional representation of portions of the operating handle, particularly illustrating the lockout mechanism in position to prevent placing the operating switch of the tool in its ON position.
Figure 9:
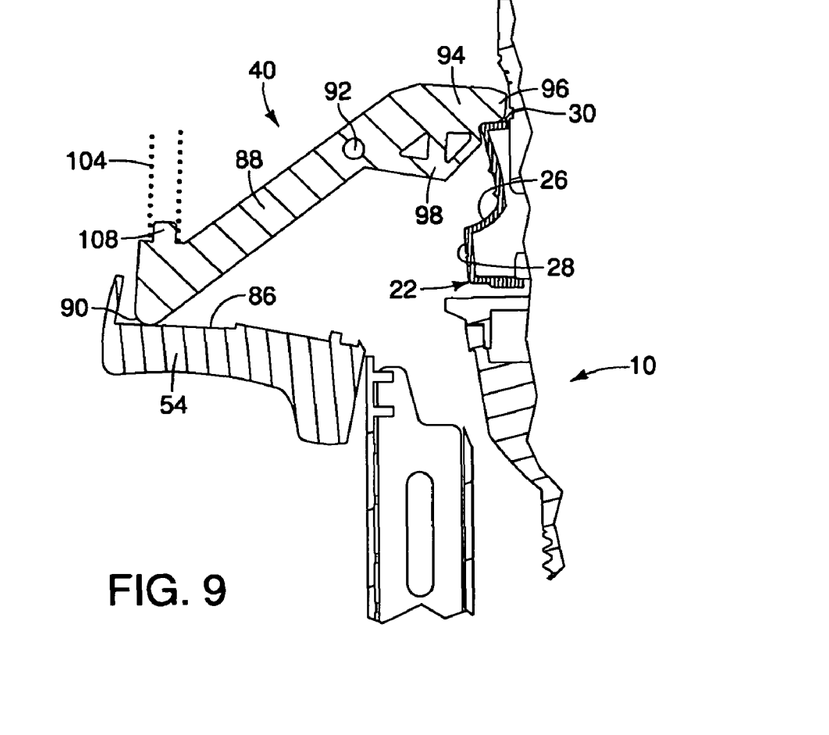
FIG. 9 is a view similar to FIG. 8, but illustrating the lockout mechanism having been positioned to permit the trigger to place the operating switch in an ON position, and showing the trigger in its depressed position which moved the switch cap of the operating switch to its ON position.

As is also shown in FIG. 5, the trigger 54 is pivotally mounted in the handle portion 42 around pivot 84. While not shown in FIGS. 5 and 6, it has a recessed top surface 86 as shown in FIGS. 8 and 9 configured to engage an elongated lever 88 at its bottom surface 90. The lever 88 is pivotally connected to the upper body portion 44 by pivot 92 and also has a top end portion 94 with an outer tip portion 96 which extends into the channel 66 of the top body portion 44. The pivot 92 may be outwardly extending hubs that engage corresponding recess in the top body portion 44, with the hubs being integrally formed with the lever 88. Alternatively, a suitable separate pivot pin could be employed.

Figure 6:
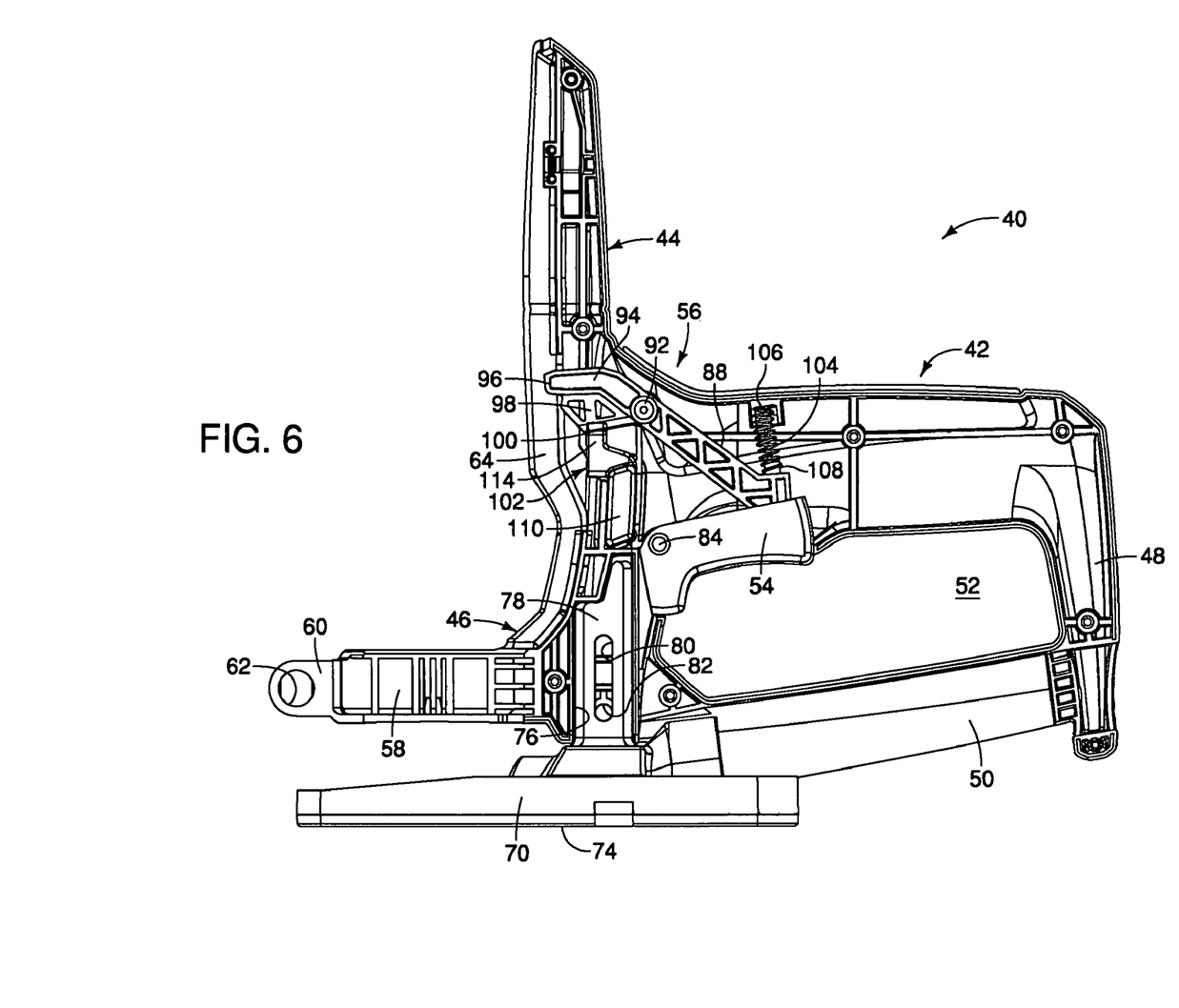
FIG. 6 is a view similar to FIG. 5, but showing the operating handle having its trigger depressed as required for placing the tool switch in its ON position.

The end portion 94 is angled at approximately 45 degrees so that the tip portion 96 is approximately horizontal as shown. The upper end portion 94 also has a lower extension 98 with a bottom surface 100 that is provided for engaging a lockout member indicated generally at 102. When the trigger 54 is depressed or moved upwardly as shown in FIG. 6, the lever 88 is rotated in a counterclockwise direction around the pivot 92 so that the tip portion 96 will be moved downwardly.

In this regard, the tip portion 96 is configured to engage the top surface 30 of the switch button 22 so that when the trigger 54 is depressed, the switch button 22 will be moved to its ON position. This assumes, of course, that the lockout button 102 is not positioned to prevent such movement.

The linkage mechanism 56 also includes a compression spring 104, the upper end of which is confined in a recess 106 in the handle portion 42 and the lower end of which fits around a tab 108 provided on the lever 88. The compression spring 104 is configured and sized sufficient to put a biasing force on the linkage mechanism 56 to hold the mechanism in its position shown in FIG. 5 where the tip portion 96 is in its highest position, i.e., the switch button gap 22 is in its OFF position.

Figure 3:
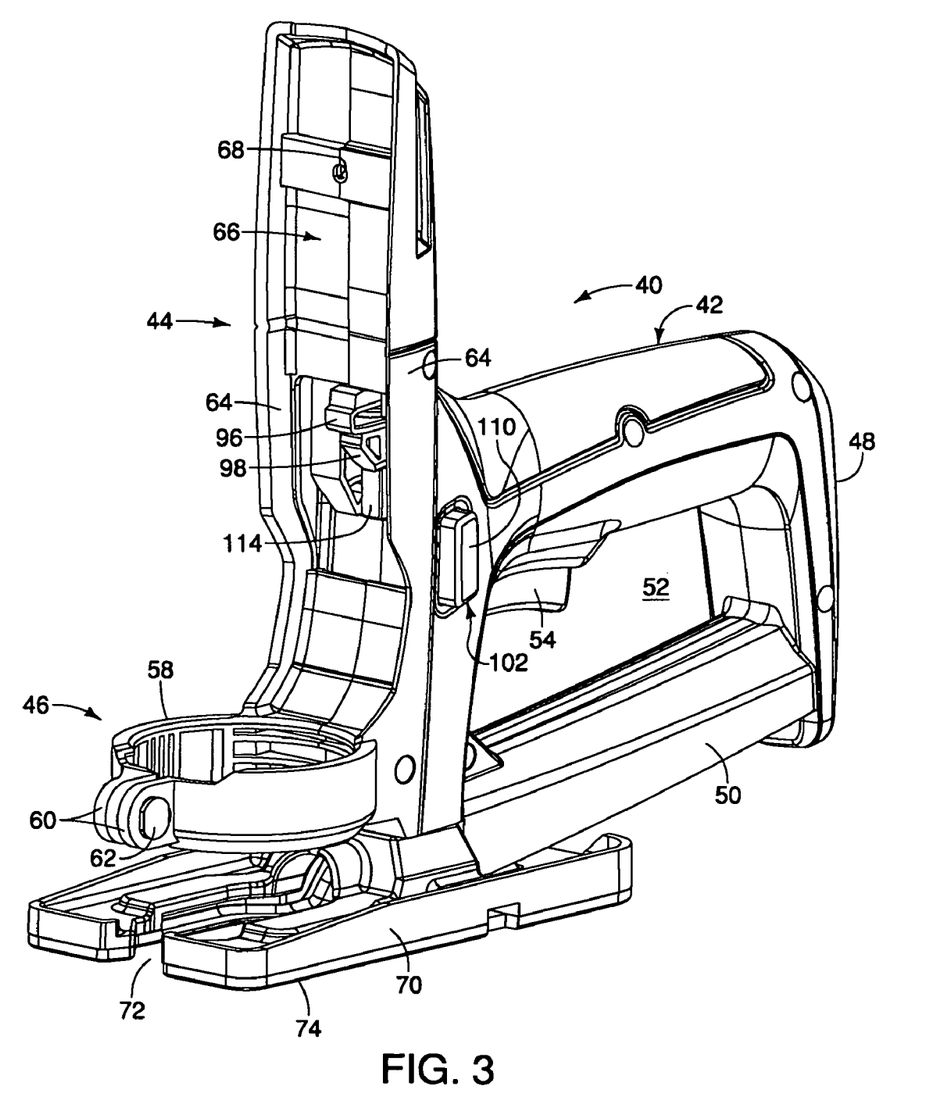
FIG. 3 is a front left perspective view of a detachable operating handle embodying the present invention that is configured to be attached to the tool shown in FIGS. 1 and 2.
Figure 4:
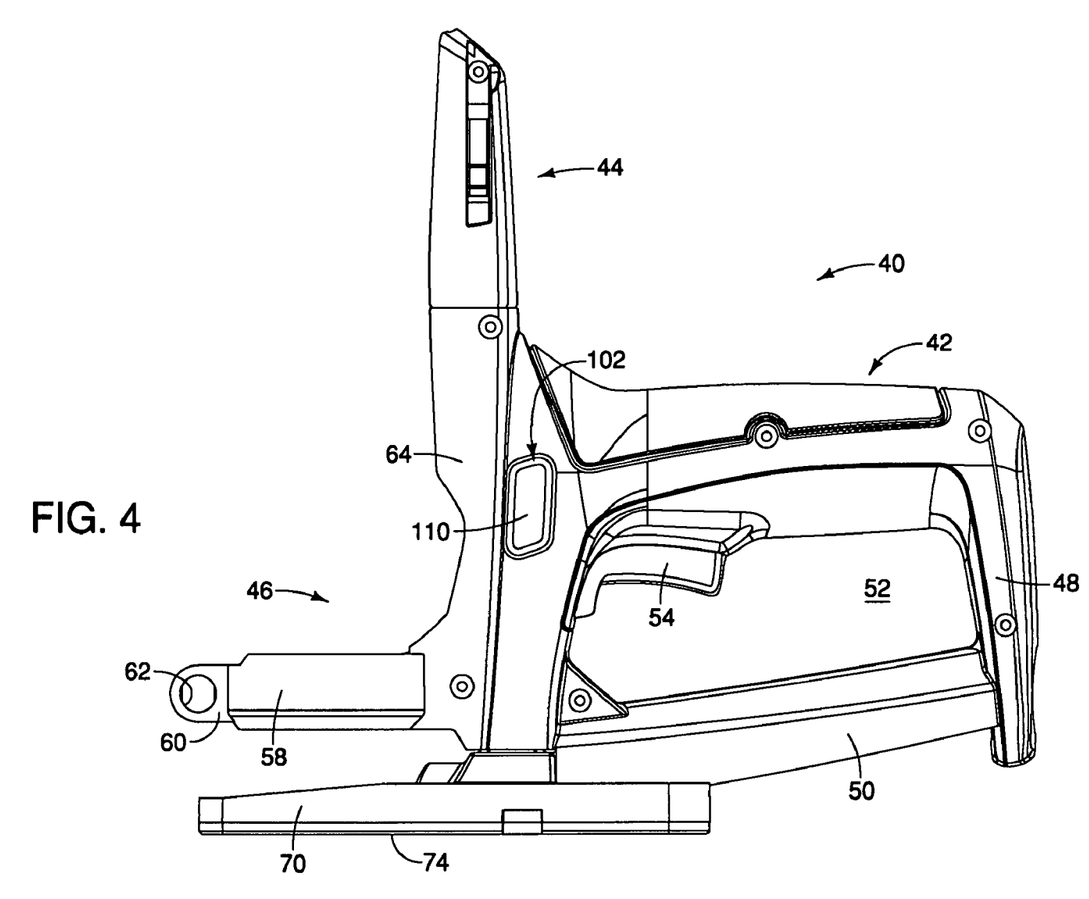
FIG. 4 is a left side elevation of the detachable operating handle shown in FIG. 3.

With regard to the lockout member 102, it is shown in FIG. 3 to be mounted in the upper body portion and extends through openings therein so that it is accessible by a user and can be slidably moved in either direction by a user using either their thumb or forefinger to slide the lockout member 102 into and out of its lockout position.

Figure 7:
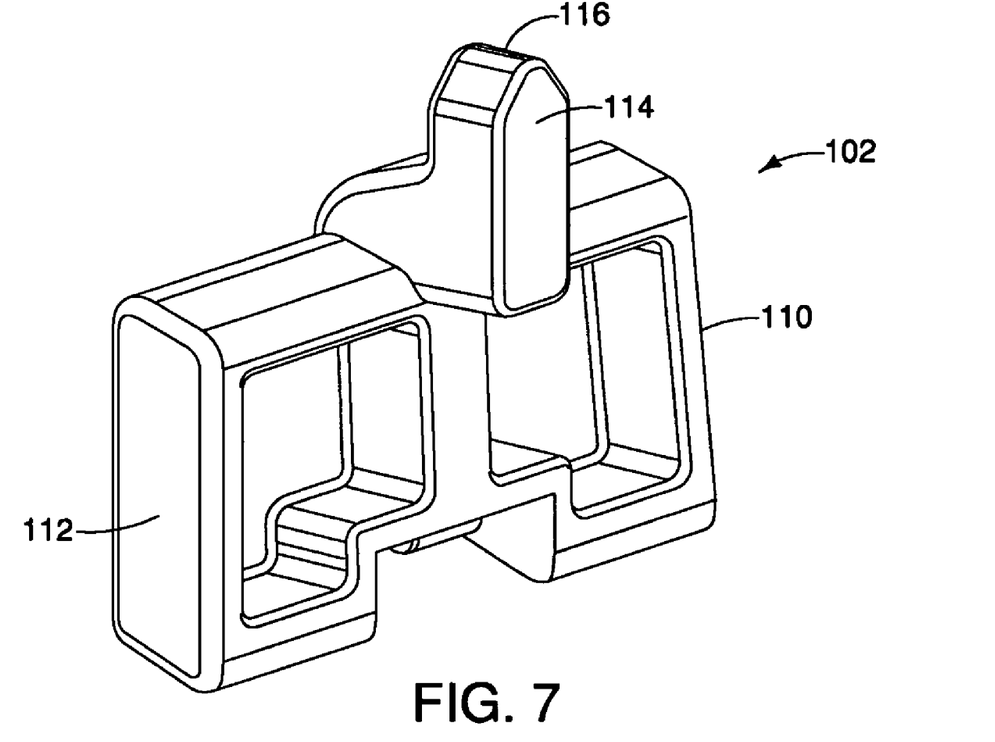
FIG. 7 is a perspective view of a portion of a lockout mechanism shown in FIGS. 3, 4 and 5.

The lockout member is shown in detail in FIG. 7 and has a width that is slightly larger than the width of the upper body portion 44 with end surfaces 110 and 112, a center upper extension 114 with a contact surface 116 that is configured to engage the lower extension 98 of the tip portion 96 of the lever 88. This is diagrammatically illustrated in FIG. 8 where the lockout member 102 is shown to be engaged with the lower extension 98. In this position, the switch cap 22 is in its OFF position and the lockout member 102 would prevent from being moved by if the user were to attempt to depress the trigger 54. The lockout member is shown to be in contact with the lower extension in FIG. 3. The width of the extension 114 is such that movement in one direction or another by the user pushing on one of the contact surfaces 110 or 112 will move it out of engagement with the lower extension 98 and enable depression of the trigger 54 to move the switch cap 22 as is diagrammatically shown in FIG. 9.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention. Various features of the invention are set forth in the following claims.

What is claimed is:

1. A detachable operating handle for a power tool of the type that has an elongated housing with a nose portion having an output shaft and a tool bit holding device for securing a tool bit, an operating switch having a switch cap located on the housing near the nose portion, with the switch cap having an outer recess and being configured to move between on and off positions, said handle comprising:

a housing having an upper body portion, a lower body portion and an elongated handle portion;

said upper body portion extending generally parallel to a central longitudinal axis of the tool and being configured to mate therewith when said operating handle is attached to the power tool;

said lower body portion being configured to engage the nose portion of said power tool when said operating handle is attached thereto;

said elongated handle portion having a longitudinal axis that is generally perpendicular to said central longitudinal axis of the power tool when the handle is coupled to the power tool;

a trigger member located in the bottom of said handle portion and being moveable between depressed and rest positions for selectively activating the operating switch of the power tool;

a linkage mechanism for interconnecting said trigger member and the switch cap for moving the switch cap to turn the switch to its on position;

said linkage mechanism having a lockout mechanism for preventing said trigger member from activating said operating switch until said lockout mechanism is moved to a release position.

2. A detachable operating handle as defined in claim 1 further comprising a selectively adjustable base plate foot coupled to said lower body portion for adjusting the depth of penetration of a secured tool bit.

3. A detachable operating handle as defined in claim 1 wherein said linkage mechanism comprises:

an elongated lever pivotably mounted in said housing and having a rear end portion configured to be contacted by said trigger member and a front end portion configured to engage the recess of the switch cap, whereby depressing said trigger pivots said lever and moves the switch cap to move the switch to its on position; and a lockout member movable between a locking position and a release position, said locking position preventing pivoting of said lever.

4. A detachable operating handle as defined in claim 3 wherein said lockout member has a tongue portion for engaging said lever, said lockout member being slidable in said housing between a locking position where said tongue prevents pivoting of said lever and said release position where said tongue moves out of engagement with said lever.

5. A detachable operating handle as defined in claim 1 wherein said lockout member is slidable in said housing in a direction generally perpendicular to the central longitudinal axis of the power tool.

6. A detachable operating handle as defined in claim 4 wherein said linkage mechanism further comprises a spring for biasing said lever in a direction opposite the direction of movement of said lever caused by depressing said trigger.

7. A detachable operating handle as defined in claim 6 wherein said spring is a compression spring having one end mounted in said housing and an opposite end bearing against said lever.

8. A detachable operating handle as defined in claim 1 wherein said trigger is elongated and is pivotally attached to said housing at a first end portion and has an opposite second end portion that engages said lever.

9. A detachable operating handle as defined in claim 5 wherein said lockout mechanism includes said lockout member that is accessible by a user when gripping the handle, said lockout member extends through openings on opposite sides of said housing, enabling a user to push said lockout member from side to side to selectively place it in said locking and release positions.

10. A detachable operating handle as defined in claim 9 wherein said lockout member is positioned to be moved by the thumb and fore finger of a user when the user is positioned to engage said trigger member to turn on the operating switch.

11. A detachable operating handle as defined in claim 5 wherein the operating switch is normally biased in its off position, so that said trigger member is required to be depressed in its on position to maintain said power tool switch in its on position.

12. A detachable operating handle for a power tool of the type that has an elongated housing with a nose portion having an output shaft defining a central longitudinal axis of the tool and a tool bit holding device for securing a tool bit, an operating switch having a switch cap located on the housing near the nose portion, with the switch cap having an outer recess and being configured to slide between on and off positions and be biased toward said off position, said handle comprising:

a housing configured to cooperatively mate with the power tool housing and be attached at least to the nose portion of the power tool;

said housing having an elongated handle portion having a longitudinal axis that is generally perpendicular to said central longitudinal axis of the power tool when the handle is coupled to the power tool;

a trigger member located in the bottom of said handle portion positioned to be moved between depressed and rest positions by a user's finger while holding the handle portion;

a linkage mechanism for interconnecting said trigger member and the switch cap for moving the switch cap to its on position;

said linkage mechanism having a lockout mechanism for preventing said trigger member from moving the switch cap when said lockout mechanism is in a locked position and permitting said trigger member to move the switch cap when in a release position.

13. A detachable operating handle as defined in claim 12 wherein said linkage mechanism comprises an elongated lever pivotably mounted in said housing and having a rear end portion configured to be contacted by said trigger member and a front end portion extending from a mating surface of said housing toward said switch cap, said outer end surface of said front end portion being configured to engage said switch cap, whereby depressing said trigger pivots said lever and moves the switch cap to its on position; and a lockout member movable between a locking position and a release position, said locking position preventing pivoting of said lever.

14. A detachable operating handle as defined in claim 13 wherein said lever is pivotably mounted in said housing at a location generally midway along the length thereof.

15. A detachable operating handle as defined in claim 14 wherein said lever is oriented at an acute angle relative to the said longitudinal axis of said handle portion and has opposite end portions that are generally parallel thereto.

16. A detachable operating handle for an elongated handheld portable power tool with a nose portion having an output shaft and a slidable operating switch having an outer recess and being configured to slide between on and off positions, said handle comprising:

a housing configured to cooperatively mate with the power tool and hold it in a generally vertical orientation and be attached at least to the nose portion of the power tool, the housing having an elongated generally horizontal gripping handle portion;

a trigger located in the bottom of said gripping handle portion positioned to be moved between depressed and rest positions by a user's finger while holding the gripping handle portion;

a linkage mechanism for interconnecting the trigger and the switch, and the linkage mechanism having a lockout mechanism for preventing the trigger from moving the switch when the lockout mechanism is in a locked position and permitting the trigger to move the switch when in a release position.

* * * * *